United States Patent
Menegoli et al.

(10) Patent No.: US 8,441,231 B2
(45) Date of Patent: May 14, 2013

(54) BIDIRECTIONAL HYSTERETIC POWER CONVERTER

(75) Inventors: Paolo Menegoli, San Jose, CA (US); Fabio Alessio Marino, San Jose, CA (US)

(73) Assignee: ETA Semiconductor Inc., San Jose, CA (US)

( * ) Notice: Subject to any disclaimer, the term of this patent is extended or adjusted under 35 U.S.C. 154(b) by 192 days.

(21) Appl. No.: 13/134,026

(22) Filed: May 27, 2011

(65) Prior Publication Data

US 2012/0299553 A1    Nov. 29, 2012

(51) Int. Cl.
*H02J 7/00*    (2006.01)

(52) U.S. Cl.
USPC .......................................... 320/128; 323/282

(58) Field of Classification Search .................... 320/128
See application file for complete search history.

(56) References Cited

U.S. PATENT DOCUMENTS

| | | |
|---|---|---|
| 4,736,151 A | 4/1988 | Dishner |
| 5,359,280 A | 10/1994 | Canter et al. |
| 5,602,464 A | 2/1997 | Linkowsky et al. |
| 5,734,258 A | 3/1998 | Esser |
| 6,462,520 B1 * | 10/2002 | Mangtani et al. ............. 323/271 |
| 6,894,461 B1 | 5/2005 | Hack et al. |
| 7,161,331 B2 * | 1/2007 | Wai et al. ...................... 323/222 |
| 7,786,709 B2 * | 8/2010 | Lawson et al. ................ 323/206 |
| 8,009,443 B2 * | 8/2011 | Krause ............................ 363/17 |
| 2010/0237840 A1 | 9/2010 | Walter et al. |

OTHER PUBLICATIONS

U.S. Appl. No. 12/930,498, Menegoli et al.

* cited by examiner

*Primary Examiner* — Ramy Ramadan

(57) ABSTRACT

A novel switching hysteretic bidirectional power converter is presented. The converter includes the generation of a synthetic ripple signal and feedback networks to hysteretically control the power converter both when the converter operates as a boost converter with the flow of power in one direction, and when the converter operates as a buck power converter with the flow of power in the opposite direction.

The presented approach provides a switching converter with a much simpler control method with respect to conventional inductive bidirectional power converters. The hysteretic control provides stable operation in all conditions with excellent load and line transient response. Furthermore this allows the operation of the bidirectional power converter with much higher switching frequencies with respect to state of the art conventional approaches, thus reducing the cost and size of the passive components storing energy during the conversion. Since bidirectional switching power converters are used mainly when the flow of power is bidirectional, the typical application involves the charging and discharging of batteries, and as part of this novel approach, an hysteretic battery charger including hysteretic constant current and constant voltage control is introduced as part of a larger bidirectional switching power converter.

20 Claims, 6 Drawing Sheets

BIDIRECTIONAL HYSTERETIC POWER CONVERTER

BACKGROUND OF THE INVENTION

1. Field of the Invention

The present invention is in the field of power converters. The present invention is further in the field of semiconductor switching power converters. The present invention further relates to the field of integrated hysteretic control methods for switching power converters and circuits. The present invention is further in the field of integrated switching power converters. The implementation is not limited to a specific technology, and applies to either the invention as an individual component or to inclusion of the present invention within larger systems which may be combined into larger integrated circuits.

2. Brief Description of Related Art

Modern electronic applications require power management devices that supply power to integrated circuits or more generally to complex loads. In general, power switching converters are becoming more and more important for their compact size, cost and efficiency. The switching power converters comprise isolated and non isolated topologies. The galvanic isolation is generally provided by the utilization of transformers. Although the subject invention is mainly focused on non isolated switching power converters, it refers both to isolated and non isolated power converters.

Modern switching power converters are in general divided in step down power converters also commonly known as "buck converters" and step up power converters commonly known as "boost converters". This definition stems from the ability of the converter to generate regulated output voltages that are lower or higher than the input voltage regardless of the load applied.

Bidirectional switching power converters are characterized by the ability to operate both as buck converters and as boost converters simply by inverting the flow of power conversion and by utilizing the same switching elements and the same passive components to store energy during the power conversion operation. Typical applications involve the charging and discharging of a battery, hooked to one side of the converter and the use of a connector on the other side of the converter such that the converter can be coupled to a power source to charge the battery or to a load to utilize the energy stored in the battery itself.

A common application could be the charging of a lithium ion battery of a portable device through an Universal Serial Bus (USB) power source external to the portable equipment and the utilization of the battery charge to power an external device connected by means of the USB interface. Nowadays the USB voltage provided is about 5V and the maximum voltage at which the battery can be charged, if lithium ion, is 4.2V-4.3V depending on the specific chemistry and battery manufacturing flow, therefore the charging of the battery takes place by operating the power converter as a buck converter. However when an external device is hooked to the USB interface to be powered up, the voltage to be provided has to be regulated at about 5V, therefore a boost mode operation is requested by the bidirectional power converter to boost up the voltage rail from the battery voltage to 5V.

The main motivation to make use of bidirectional switching power converters is to lower cost and save board space. However the control of a buck converter is quite different from the one for the boost converter because the inherent mode of operation is very dissimilar. The small signal analysis of the boost circuit in CCM (Continuous Conduction Mode) points out the presence of a right half plane zero (RHPZ), which leads to an apparently counter-intuitive decrease of the current in the diode when the load current increases, since the duty cycle increases. This RHPZ can complicate the stability of the loop and generally is dealt with by rolling off the loop gain of the switching voltage regulator at relatively low frequency, making the overall response of the boost converter quite slow.

One example of bidirectional power converter that operates as a buck in one direction and as a boost in the opposite direction swapping input and output depending on the required regulated voltage is described in Dishner (U.S. Pat. No. 4,736,151). Dishner implements the concept with a typical inverting buck boost topology which implies potentially large negative voltages. Another prior art example is described in Canter et al. (U.S. Pat. No. 5,359,280) where a battery is charged or discharged by the converter. A further example is detailed in Linkowsky et al. (U.S. Pat. No. 5,602,464) where a transformer is utilized and the current is sensed in amplitude and sign by a sense resistor in series to one of the winding of the transformer.

Another example of bidirectional buck boost is described in Esser (U.S. Pat. No. 5,734,258) where a four switches buck boost topology is shown. Hack et al. (U.S. Pat. No. 6,894,461) describes a more general approach with multiple control loops. Walter et al. (US Patent Application 2010/0237840) describes one bidirectional power converter that allows the flow of power in both directions depending on a mode selection signal provided to the converter. However this last example, as all the other cited prior art, does not implement the switching power converter with hysteretic control, limiting the use of these power converters only at relatively low operating frequencies In fact Walter et al specifically described the possible control methods clearly omitting the hysteretic or pseudo hysteretic approach due to the intrinsic difficulties in implementing hysteretic control loops, in particular for boost converters.

The limitations described above for boost power converters are not present in buck power converters, in fact faster control methods, hysteretic and pseudo-hysteretic in nature, are becoming increasingly popular for their inherent simplicity and faster control. Generally the boost converters are controlled with PID (proportional-integral-derivative) type of control method. In particular current mode controls are quite common because they include two nested loops: one for the control of the output voltage and one for the control of the output current. However, as mentioned, these types of control methods do not present high bandwidth and require the adoption of large output capacitors to obtain acceptable load transient responses.

High frequency switching power converters show significant advantages over conventional power converters operating at low frequencies, since they allow the use of low value inductors and capacitors reducing significantly the cost and board space of the power management section. Buck converters can successfully be operated at high frequency by using hysteretic and pseudo-hysteretic approaches. Generally the control loop of pseudo-hysteretic converters is relatively simple and the converter's output voltage is summed to a ramp signal to generate a synthetic ripple signal. This signal is then compared to a reference to determine the duty cycle to obtain the desired voltage regulation.

Fast control of boost converters is difficult to obtain in CCM because there is always an intrinsic delay in providing energy to the load since the inductor has to be first charged with current flowing in it. If the load suddenly changes from a low current to a high current load, the boost converter circuit has to spend some time to charge the inductor first and during this time no current/energy is supplied to the load. This phenomenon is not present in buck converters where by applying current to the inductor, the same current is flowing in the load as well.

Generally this synthetic ripple signal is fed to a fast comparator that determines the charge and discharge timing of the inductor. For buck converters the implementation of a pseudo hysteretic control is relatively simple because the output stage of the buck, along with the inductor and the output capacitor, forms the integrating section of the converter that can be seen as a delta sigma converter. As mentioned above, the buck converter charges the inductor while supplying current to the load.

The intrinsic delay of the boost architecture, deriving from the fact that the boost does not supply current to the load while charging the inductor, makes the implementation of an hysteretic approach much more difficult to obtain. However as taught in the recently filed patent application (U.S. Ser. No. 12/930,498) by the same inventors, by summing a signal in phase to the inductor charge current to a signal proportional to the output voltage, an hysteretic approach can successfully be implemented for a boost power converter as well.

This method of obtaining a fast switching pseudo hysteretic boost converter enables the use of hysteretic approach in both modes of operation of a bidirectional power converter. However several challenges have to be overcome. The ideal bidirectional power converter could make use of a single feedback network that generates the synthetic ripple in both modes of operation. Although not a necessary requirement, the optimization of the control loop by combining the feedback networks would simplify the circuitry and increase the efficiency in light load conditions for effect of a reduced quiescent current.

In addition, since the main utilization of a bidirectional power converter is related to the charge and discharge of a battery, typically a battery charger is required to operate in "constant current" mode or in "constant voltage" mode depending on the voltage of the battery itself. The constant current mode is required when the voltage of the battery is quite lower than its desired final (fully charged) value. The level of charging current may be different from battery to battery and it is generally dependent on the total charge of the battery and referred to as trickle charge current or full current. In this mode of operation the switching power converter has to operate with minimum possible level of current ripple maintaining the same level of average charge current.

The hysteretic approach of constant current mode at constant switching frequency presents its challenges and the applicants are not aware of any such implementation by third parties. The constant voltage mode is generally phased in smoothly in the control by the use of transconductance operational amplifiers when the battery voltage approaches the full charge. In that case the charge current is gradually decreased and the control gradually transitions from constant current mode to constant voltage mode and it is more similar to the one commonly used for buck power converters. Here the main challenge is to operate with a pseudo hysteretic approach because the battery acts like a large output capacitor complicating significantly the stability of the system.

In fact a large output capacitor introduces a low frequency pole in the frequency response of the system. A low frequency pole inherently makes the system very slow to react to transient, but charging a battery does not require fast frequency response. However, if precaution is not taken, the low frequency pole introduced by the effective large capacitance of the battery could induce low frequency oscillation of the output voltage. Another challenge is to maintain the same switching frequency during the whole phase transition migrating from the constant current mode to the constant voltage mode.

A further challenge is characterized by the fact that when the full charge is approached, and if no load is draining the battery, the system may tend to operate in DCM (Discontinuous Conduction Mode). In DCM mode the system operates in PFM (Pulse Frequency Modulation) and the charge is delivered in small pulses to the battery. For high frequency operation the inductor value is quite small and it is important to guarantee controlled current pulses in amplitude in addition to a stable system.

It is therefore a purpose of the present invention to describe a novel structure of a bidirectional switching power converter with synthetic ripple generation that can operate at high switching frequency with pseudo-hysteretic control, operating at constant frequency and with high efficiency both in CCM and DCM depending on the load conditions. It is another purpose of the present invention to describe a fully hysteretic battery charger that may be part of the bidirectional hysteretic switching power converter.

SUMMARY OF THE INVENTION

It is an objective of the present invention to provide an hysteretic bidirectional switching power converter that can operate in both directions at high switching frequency therefore allowing a reduction of the value, size, and cost of its passive components. In one direction the converter would operate as a buck converter and in the opposite direction it would operate as a boost converter, utilizing the same power devices, the same inductor and possibly the same or similar control methods.

It is another objective of the present invention to provide a switching bidirectional power converter that includes an hysteretic or pseudo-hysteretic control circuit by means of one or more feedback networks that generate signals deriving from the information of the instantaneous output voltage, both from a dc standpoint and from an ac standpoint, and a means of generating one or two synthetic ripple signals that are proportional and in phase with the inductor current allowing very fast load transient response when operating as a boost converter.

It is another objective of the present invention to provide a switching bidirectional converter with high efficiency at any load condition by means of control in CCM (Continuous Conduction Mode) mode of operation and DCM (Discontinuous Conduction Mode) mode of operation depending on the load impedance values.

It is another objective of the present invention to provide a constant frequency switching hysteretic battery charger that can operate as a buck power converter or as a boost power converter and that operates in constant current mode and constant voltage mode depending on the charge conditions of the battery. The main objective is to operate the battery charger as part of a bidirectional switching power converter that can charge the battery at high frequency and, in the opposite direction, utilize the energy stored in the battery to power up a load by converting power again at high switching frequency.

The present invention describes an inductive switching bidirectional power converter that generates synthetic ripple signals that can be compared to a reference voltage and provide the base for an hysteretic control of the converter in both modes of operation. The circuit proposed is relatively simple even though the detailed characteristics of the power converter such as its efficiency at different load conditions, the output voltage ripple in different load conditions, and the response to the load and line transient depend on and relate directly to the overall implementation and on the value of the output capacitor, output inductor, input voltage, output voltage and switching frequency.

The present invention describes an hysteretic bidirectional power converter that may be utilized to charge a battery in one direction and that utilizes the energy stored in the battery to supply energy to a load in the other direction. It is important to note that when the converter operates as a battery charger in one direction, be that a buck or a boost operation, the converter may operate in constant current mode or in constant voltage mode. The synthetic ripple signals used to determine the control mechanism of the switching regulator may therefore have characteristics dependent on the conditions and mode of operation of the power converter.

The present invention, in the embodiment shown in FIG. 2, describes a bidirectional power converter that, when the current in the inductor L1 flows from left to right, that is from the node 1 to the node 2, operates as a boost regulating the voltage at the node 3 to be higher than the voltage of the battery 4 on the left side of the schematic. When the current in the inductor L1 flows from right to left, that is from the node 2 to the node 1, the converter operates as a buck regulating the current or the voltage of the battery starting from a higher voltage at the node 3.

The switch S1 represents the high side power transistor, and generally is switched in opposition of phase with respect to the low side power transistor rapresented by the switch S2. The switch S3 operates substantially in phase with the switch S2 and its main purpose is to sense the voltage of the switching node 2 when the low side is turned on and to report it to the positive terminal of the resistor R5, so as to monitor the current in the low side power transistor symbolized by the switch S2. This current is the charging current of the inductor when the converter operates as a boost and it is the inductor re-circulating current when it operates as a buck.

The feedback network 5 is mainly composed of passive components to generate a synthetic ripple signal to be fed to the hysteretic comparator 7 in both modes of operation. According to this embodiment the resistor dividers, that are commonly placed at the outputs of the converters to shift down the output voltage, are included in the block 5. The feedback network includes a simple logic to select the right output divider depending on the mode selection signal 6. The output divider, the output voltage and eventually other elements of the feedback network are selected depending on whether the converter operates as a buck or as a boost converter. The feedback network of FIG. 2 receives as inputs the output/inputs voltages of the converter, the switching node and the signal at the positive terminal of the resistor R5, but many other configurations and topologies of feedback network may be implemented.

The hysteretic comparator 7, which is generally a very fast comparator in order to allow high switching frequency operation, feeds a block 8 that includes a control logic and the pre-driver circuits. The signals at the nodes 9 and 10 symbolize the gate driver voltages of the main power transistors. The node 3 may be connected to a USB (Universal Serial Bus) or an interface of other type and nature to couple the node 3 to either an external source of power to charge the battery or to a device to be powered up by the battery through the converter of FIG. 2.

The signal at the positive terminal of the resistor R5 is used mainly when the converter operates as a boost in order to extract a signal proportional and in phase to the inductor charge current for the generation of the synthetic ripple signal, but it could be implemented in many other ways as well. The signal across the resistor R5 depends on the on resistance of the low side power transistor, while during the recirculation phase (when S2 is off) it falls with a time constant that is proportional to the value of R5 and the total capacitance present in the feedback network 5 as seen at the node 11. This signal is therefore in phase with the inductor current.

Since the signal across the resistor R5 is proportional to the inductor current, it can also be utilized to implement an overcurrent protection simply by means of comparing the voltage across R5 with a reference voltage that relates to the maximum inductor current allowable. Furthermore since, as mentioned above, during the recirculation phase, the voltage across R5 discharges with a time constant dependent on the resistor value and the total capacitance seen at the input 11 of the feedback network 5, the value of the resistor R5 affects directly the converter switching frequency.

This correlation can be utilized to form a frequency control circuit where the resistor R5 is replaced by a MOS transistor whose on-resistance is modulated to maintain the switching frequency of the converter constant independently from the conditions of the power converter (input voltage, output load).

The topology and values of the components in the feedback network define the self oscillating switching frequency, the stability, and the load and line transient response performance of the converter. The switching frequency has a direct impact on the output voltage ripple and on the converter efficiency. The switching frequency can be regulated and imposed by a separate frequency control loop that can be implemented in various ways. When the switching frequency is regulated, for example by means of a PLL (Phase Lock Loop), the study of the loop becomes more complex and an accurate analysis can be performed by periodic state analysis to guarantee the circuit stability in all conditions.

Although, as mentioned above, the switching frequency could be obtained by modulating the value of the resistance R5 of FIG. 2, the methods and means for regulating the switching frequency are beyond the scope of the present invention and do not affect its novelty. The several methods and techniques to regulate the switching frequency are well known to anyone skilled in the art.

The feedback network 5 is typically composed of passive components but, more in general, it could include active components and have different functionalities, depending on the load and line conditions and on whether the converter is in CCM or DCM mode of operation.

The circuit of FIG. 3, in its preferred embodiment, describes a similar approach, the main difference being that the feedback network is here split in two separate blocks. A buck feedback network and a boost feedback network each dedicated to the operation indicated in their respective terminology. The resistor dividers composed of resistors R1, R2 and R3, R4 are, in FIG. 3, external to the feedback networks but they could clearly be included in the blocks 12 and 13. The hysteretic comparator 14 selects the input to be used based on its mode selection input signal. Again the feedback networks are depicted in FIG. 3 as having specific input signals but other implementations are also possible.

The schematic of FIG. 4 shows a particular block diagram of a bidirectional power converter when it operates as a battery charger. In particular this describes the case of a battery charger with the power source (not shown) on the right side of the circuit at a voltage higher than the maximum charging voltage of the battery. In this circuit the feedback networks are divided in a voltage feedback network 15 (which could be similar to the feedback network 12) and a current feedback network 16. This distinction is necessary because when charging the battery, the converter may operate in constant current mode or in constant voltage mode depending on the voltage of the battery during power conversion.

If and when the converter of FIG. 3 is used directly as a battery charger the voltage feedback network 15 and the current feedback network 16 may be combined in the block 12 of FIG. 3. The resistor R6 and capacitor C3 of FIG. 4, along with switch S4, perform a function very similar to the one performed by the switch S3 and R5 described above for FIG. 2. In this case the resistor R6 and the switch S4 allow the sensing of the Rdson of the high side power transistor, here simplified in the switch S1, in order to extract the information of current in S1 and therefore in the inductor during the charging phase of the inductor itself. S4 and S1 are intended to be operated substantially in phase.

The voltage at the node 17 decays with the time constant R6*C3 when the switches S1 and S4 are turned off. R6 and C3 are here shown as external to the current feedback network 16, but they could as well be included. The current feedback network, as implemented like in FIG. 4, includes also the node 18 as input to obtain accurate information of the inductor current during the recirculation phase. The current feedback network may include active components but more likely is constituted of a passive network to generate a ramp signal to be fed to the hysteretic comparator 19.

The other input of the comparator 19 may directly be a current reference signal if and when the required average current accuracy is not very high. More likely the required current accuracy for battery charger requires an accurate current sense and therefore a transconductance amplifier 20 that corrects for the charging current error is desirable. The OTA 20 feeds the other input of the hysteretic comparator 19 to adjust the DC point of the switched inductor current. The current ripple is determined by the switching frequency and by the value of the inductor L1. The means of obtaining an accurate current sensing are beyond the scope of this invention and well known to anyone skilled in the art.

When the battery voltage approaches the desired final charge voltage the charger gradually changes mode of operation into the constant voltage mode and the ramp signal generated by the voltage feedback network 15 starts toggling the hysteretic comparator 21. If the digital levels of the outputs of the comparators 19 and 21 are chosen appropriately, the NAND gate 22 selects the signal to drive the control logic and drivers block 23, so that the transition between the constant current and constant voltage modes is gradual and smooth.

FIG. 5 shows a very similar schematic to the one described for FIG. 4, with the addition of a switching frequency control block 24 that can be implemented as an FLL (Frequency Lock Loop) or as a PLL (Phase Lock Loop), as well known to anyone skilled in the art. The block 24, that performs the control of the switching frequency, monitors the drive signal from the control logic block and compares that signal with a clock signal. If the frequency of the two signals is different, the output signal 25 compensates for the frequency difference and modulates the hysteresis of the comparator blocks 19 and 21 in order to regulate the converter's switching frequency to be the same as the frequency of the clock signal.

In the depicted implementation the frequency is controlled by varying the hysteresis of the comparators, but many other means are also possible. The signal 25 is driving the hysteresis levels of both comparators even if, at any time, only one comparator may be active. This guarantees that the transition between the two modes of operation is fast and smooth without causing a large frequency perturbation. In addition to the described modes of operation when the battery voltage reaches the desired output voltage the inductor current tends to become discontinuous and the pulses of current into the battery may get less frequent, depending on the total load.

When the load current is low enough, and dependently on the output and input voltage ratio, the inductor current may reach the zero value. If the control loop operates in CCM the inductor current becomes negative impacting adversely the converter's efficiency. It is then advantageous to monitor the inductor current by means of sensing the voltage drop across the switch itself, turning off the switch when the inductor current reaches zero and resuming the switching when the ramp signal at the output of the feedback network toggles the fast comparator.

The inductor charging phase can then be kept active for a predetermined amount of time seeking the optimum trade-off between the switching frequency and the output voltage ripple with the purpose of maximizing the overall converter efficiency. This mode is the DCM mode of operation and it is characterized by a lower switching frequency. The lower the switching frequency, the higher the output voltage ripple for a given inductor and output capacitor value. At light loads it may be desirable to allow higher output voltage ripple in order to obtain higher efficiency. The DCM mode can also be properly adjusted by choosing adequately the values of the components in the feedback network, since automatically, lighter loads command longer time for the output voltage to drop and for the synthetic ripple signal to toggle.

Similarly to what has been described above, the signal proportional to the inductor current can also be utilized as current limit sense. Additionally, the same feedback network, if appropriately sized in the values of its components, can be utilized in the case of DCM mode of operation when the load falls below a certain value.

FIG. 6 shows the simulation results of the circuit described in FIG. 5. In particular in this simulation the charge of the battery has been accelerated for practical purposes. It can be noted that waveform 27 shows the battery voltage (in this case to be regulated arbitrarily at 3V) and the waveform 26 the inductor current. It clearly shows that when the output voltage approaches the desired value, the inductor current starts decreasing transitioning to constant voltage mode of operation. When the inductor current decreases to value that are negative the converter switches to DCM mode of operation, turning off both power transistors and operating in PFM.

In the simulated circuit the value of the inductor was 100 nH and the switching frequency was regulated to be 40 MHz. The simulated results show that the hysteretic approach works with excellent result even to charge a battery or a load with large output capacitors.

As is clear to those skilled in the art, this basic system can be implemented in many specific ways, and the above descriptions are not meant to designate a specific implementation.

BRIEF DESCRIPTIONS OF THE DRAWINGS

The features, objects, and advantages of the present invention will become apparent upon consideration of the following detailed description of the invention when read in conjunction with the drawings in which.

DETAILED DESCRIPTION OF SPECIFIC EMBODIMENTS

A FIG. 2

Figure 1:
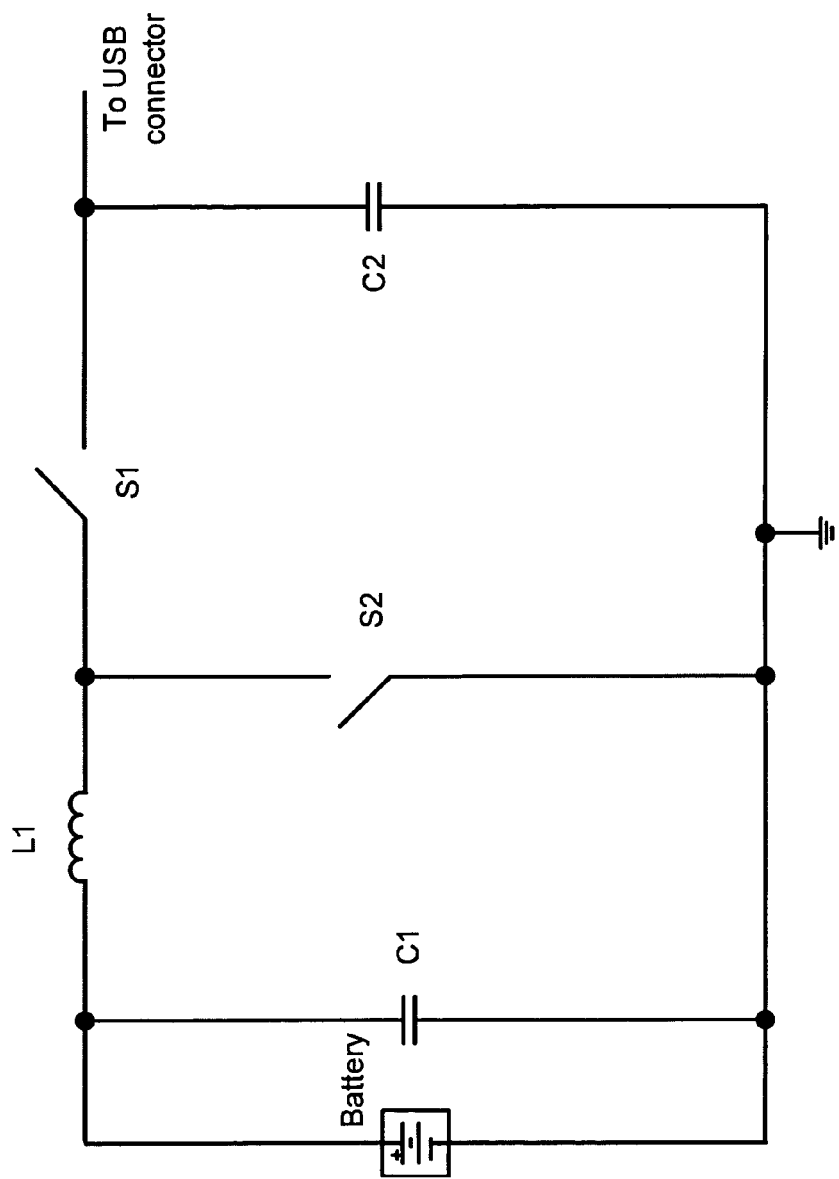
FIG. 1 shows a general bidirectional switching power converter core circuit topology (prior art).
Figure 2:
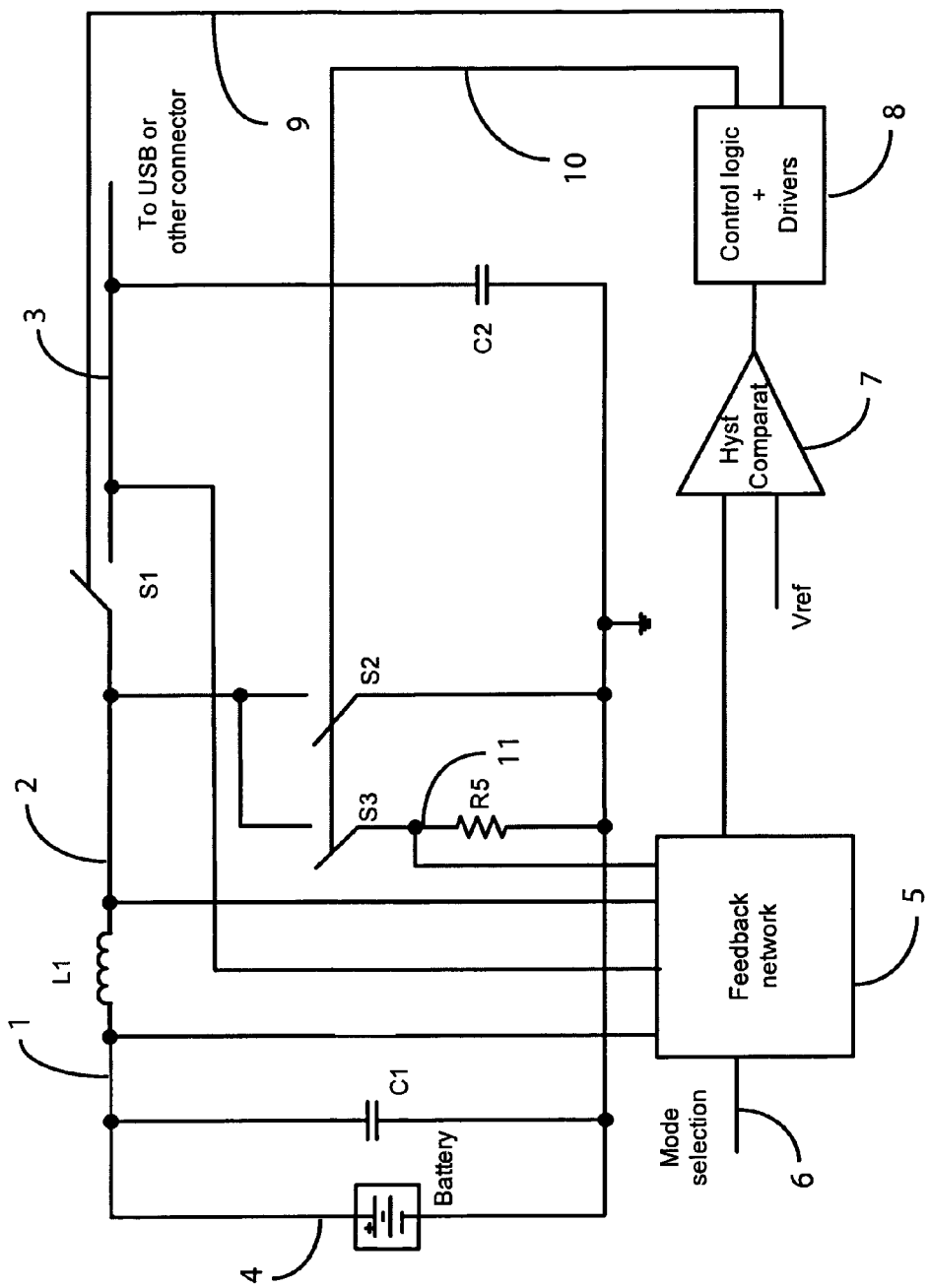
FIG. 2 shows a schematic of the bidirectional hysteretic switching power converter according to a first embodiment of the present invention.

The present invention, in the embodiment shown in FIG. 2, describes a bidirectional power converter that, when the current in the inductor L1 flows from left to right, that is from the node 1 to the node 2, operates as a boost regulating the voltage at the node 3 to be higher than the voltage of the battery 4 on the left side of the schematic. When the current in the inductor L1 flows from right to left, that is from the node 2 to the node 1, the converter operates as a buck regulating the current or the voltage of the battery starting from a higher voltage at the node 3.

The switch S1 represents the high side power transistor, and generally is switched in opposition of phase with respect to the switch S2 that represents the low side power transistor. The switch S3 operates substantially in phase with the switch S2 and its main purpose is to sense the voltage of the switching node 2 when the low side is turned on and to report it to the positive terminal of the resistor R5, so as to monitor the current in the low side power transistor symbolized by the switch S2. This current is the charging current of the inductor when the converter operates as a boost and it is the inductor re-circulating current when it operates as a buck.

The feedback network 5 is mainly composed of passive components to generate a synthetic ripple signal to be fed to the hysteretic comparator 7 in both modes of operation. According to this embodiment the resistor dividers, that are commonly placed at the outputs of the converters to shift down the output voltage, are included in the block 5. The feedback network includes a simple logic to select the right output divider depending on the mode selection signal 6. The output divider, the output voltage and eventually other elements of the feedback network are selected depending on whether the converter operates as a buck or as a boost converter. The feedback network of FIG. 2 receives as inputs the output/inputs voltages of the converter, the switching node and the signal at the positive terminal of the resistor R5, but many other configurations and topologies of feedback network may be implemented.

The hysteretic comparator 7, which is generally a very fast comparator in order to allow high switching frequency operation, feeds a block 8 that includes a control logic and the pre-driver circuits. The signals at the nodes 9 and 10 symbolize the gate driver voltages of the main power transistors. The node 3 may be connected to a USB (Universal Serial Bus) or an interface of other type and nature to couple the node 3 to either an external source of power to charge the battery or to a device to be powered up by the battery through the converter of FIG. 2.

The signal at the positive terminal of the resistor R5 is used mainly when the converter operates as a boost in order to extract a signal proportional and in phase to the inductor charge current for the generation of the synthetic ripple signal, but it could be implemented in many other ways as well. The signal across the resistor R5 depends on the on resistance of the low side power transistor, while during the recirculation phase (when S2 is off) it falls with a time constant that is proportional to the value of R5 and the total capacitance present in the feedback network 5 as seen at the node 11. This signal is therefore in phase with the inductor current.

Since the signal across the resistor R5 is proportional to the inductor current, it can also be utilized to implement an overcurrent protection simply by means of comparing the voltage across R5 with a reference voltage that relates to the maximum inductor current allowable. Furthermore since, as mentioned above, during the recirculation phase, the voltage across R5 discharges with a time constant dependent on the resistor value and the total capacitance seen at the input 11 of the feedback network 5, the value of the resistor R5 affects directly the converter switching frequency.

This correlation can be utilized to form a frequency control circuit where the resistor R5 is replaced by a MOS transistor whose on-resistance is modulated to maintain the switching frequency of the converter constant independently from the conditions of the power converter (input voltage, output load).

The topology and values of the components in the feedback network define the self oscillating switching frequency, the stability, and the load and line transient response performance of the converter. The switching frequency has a direct impact on the output voltage ripple and on the converter efficiency. The switching frequency can be regulated and imposed by a separate frequency control loop that can be implemented in various ways. When the switching frequency is regulated, for example by means of a PLL (Phase Lock Loop), the study of the loop becomes more complex and an accurate analysis can be performed by periodic state analysis to guarantee the circuit stability in all conditions.

Although, as mentioned above, the switching frequency could be obtained by modulating the value of the resistance R5 of FIG. 2, the methods and means for regulating the switching frequency are beyond the scope of the present invention and do not affect its novelty. The several methods and techniques to regulate the switching frequency are well known to anyone skilled in the art.

The feedback network 5 is typically composed of passive components but, more in general, it could include active components and have different functionalities, depending on the load and line conditions and on whether the converter is in CCM or DCM mode of operation.

B FIG. 3

Figure 3:
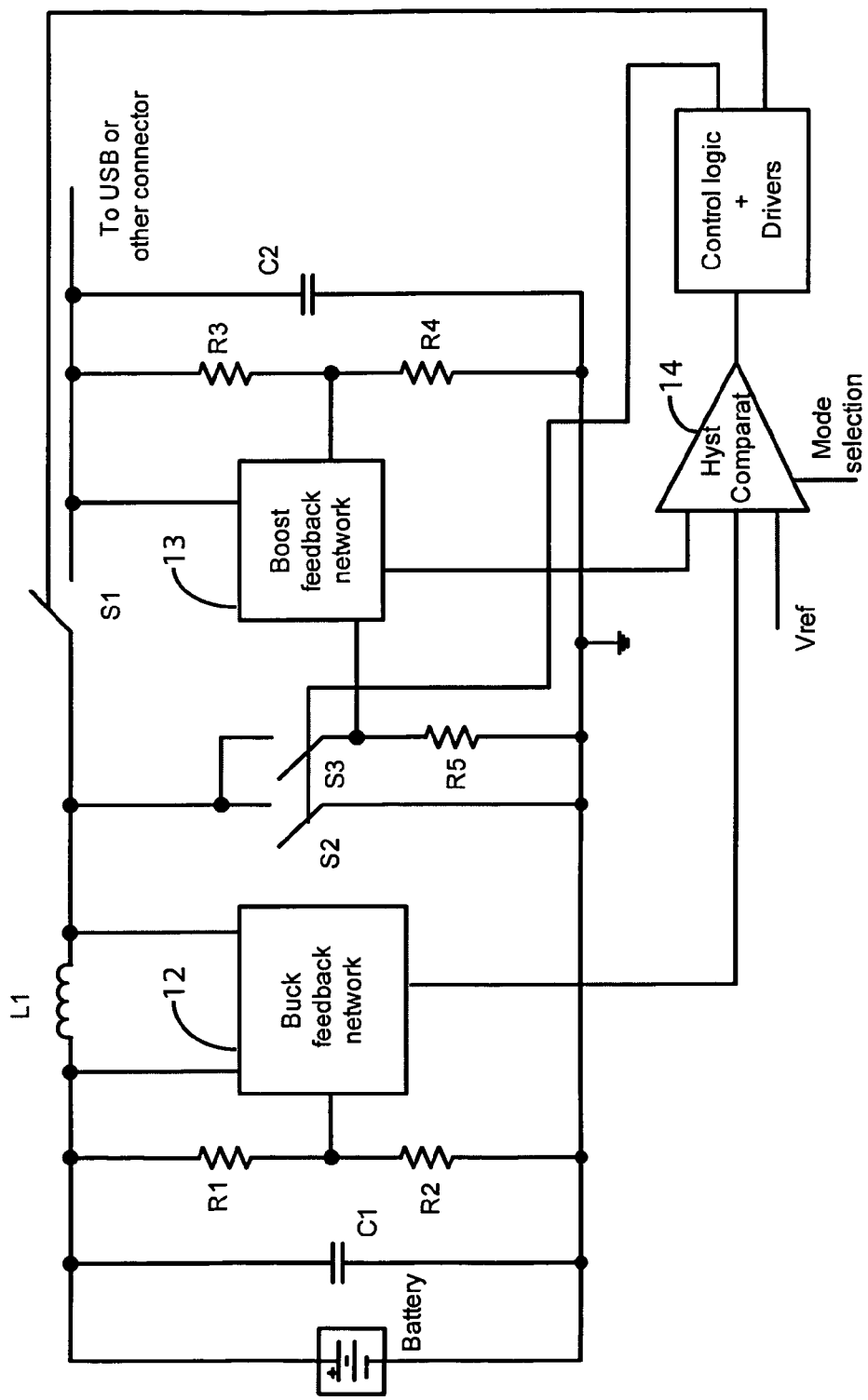
FIG. 3 shows a schematic of the bidirectional hysteretic switching power converter according to the preferred embodiment of the present invention.

The circuit of FIG. 3, in its preferred embodiment, describes a similar approach, the main difference being that the feedback network is here split in two separate blocks. A buck feedback network and a boost feedback network each dedicated to the operation indicated in their respective terminology. The resistor dividers composed of resistors R1, R2 and R3, R4 are, in FIG. 3, external to the feedback networks but they could clearly be included in the blocks 12 and 13. The hysteretic comparator 14 selects the input to be used based on its mode selection input signal. Again the feedback networks are depicted in FIG. 3 as having specific input signals but other implementations are also possible.

C FIG. 4

Figure 4:
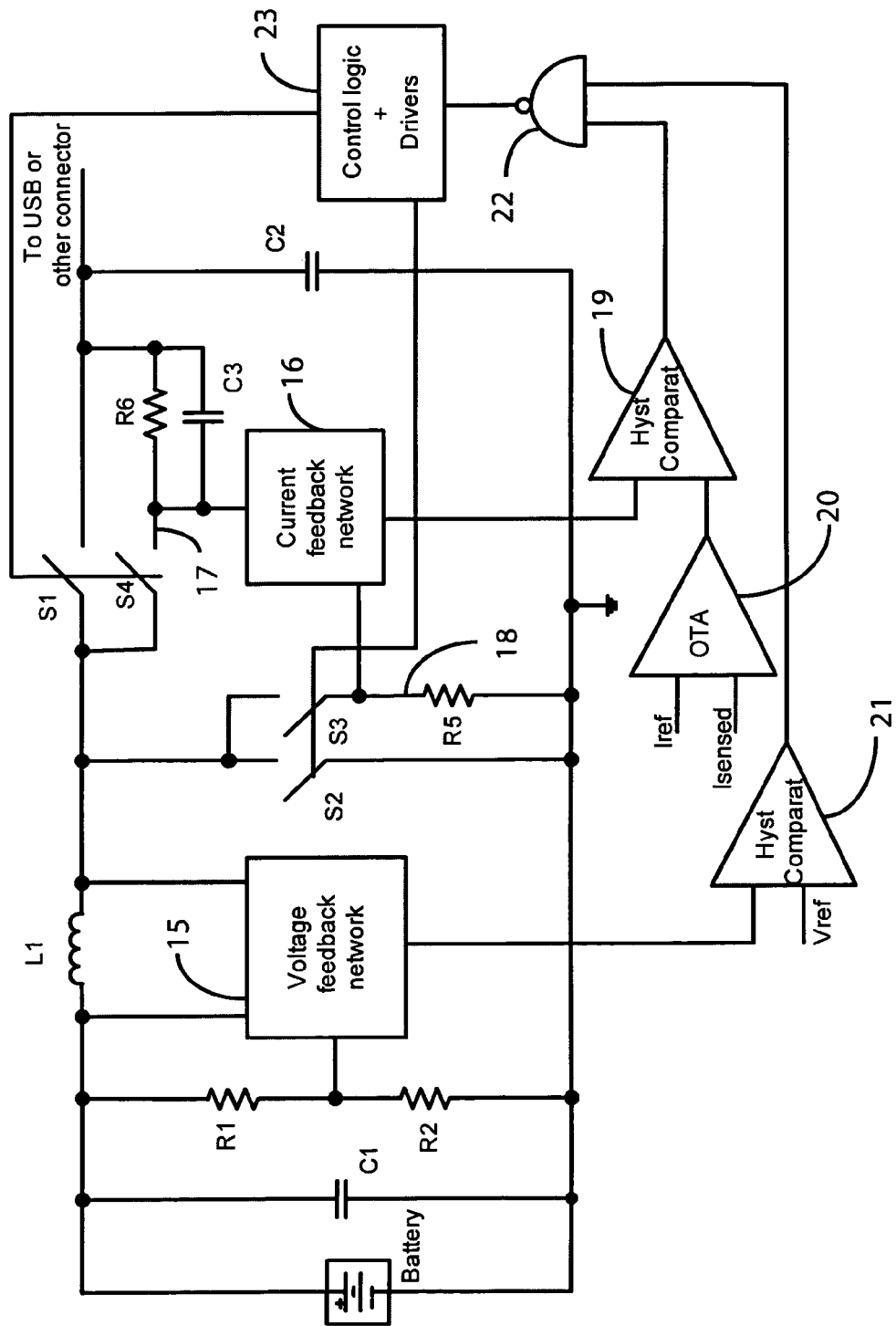
FIG. 4 shows a schematic of the bidirectional hysteretic power converter in particular when operating as battery charger according to a further embodiment of the present invention.

The schematic of FIG. 4 shows a particular block diagram of a bidirectional power converter when it operates as a battery charger. In particular this describes the case of a battery charger with the power source (not shown) on the right side of the circuit at a voltage higher than the maximum charging voltage of the battery. In this circuit the feedback networks are divided in a voltage feedback network 15 (which could be similar to the feedback network 12) and a current feedback network 16. This distinction is necessary because when charging the battery, the converter may operate in constant current mode or in constant voltage mode depending on the voltage of the battery during power conversion.

If and when the converter of FIG. 3 is used directly as a battery charger the voltage feedback network 15 and the current feedback network 16 may be combined in the block 12 of FIG. 3. The resistor R6 and capacitor C3 of FIG. 4, along with switch S4, perform a function very similar to the one performed by the switch S3 and R5 described above for FIG. 2. In this case the resistor R6 and the switch S4 allow the sensing of the Rdson of the high side power transistor, here simplified in the switch S1, in order to extract the information of current in S1 and therefore in the inductor during the charging phase of the inductor itself. S4 and S1 are intended to be operated substantially in phase.

The voltage at the node 17 decays with the time constant R6\*C3 when the switches S1 and S4 are turned off. R6 and C3 are here shown as external to the current feedback network 16, but they could as well be included. The current feedback network, as implemented like in FIG. 4, includes also the node 18 as input to obtain accurate information of the inductor current during the recirculation phase. The current feedback network may include active components but more likely is constituted of a passive network to generate a ramp signal to be fed to the hysteretic comparator 19.

The other input of the comparator 19 may directly be a current reference signal if and when the required average current accuracy is not very high. More likely the required current accuracy for battery charger requires an accurate current sense and therefore a transconductance amplifier 20 that corrects for the charging current error is desirable. The OTA 20 feeds the other input of the hysteretic comparator 19 to adjust the DC point of the switched inductor current. The current ripple is determined by the switching frequency and by the value of the inductor L1. The means of obtaining an accurate current sensing are beyond the scope of this invention and well known to anyone skilled in the art.

When the battery voltage approaches the desired final charge voltage the charger gradually changes mode of operation into the constant voltage mode and the ramp signal generated by the voltage feedback network 15 starts toggling the hysteretic comparator 21. If the digital levels of the outputs of the comparators 19 and 21 are chosen appropriately, the NAND gate 22 selects the signal to drive the control logic and drivers block 23, so that the transition between the constant current and constant voltage modes is gradual and smooth.

D FIG. 5

Figure 5:
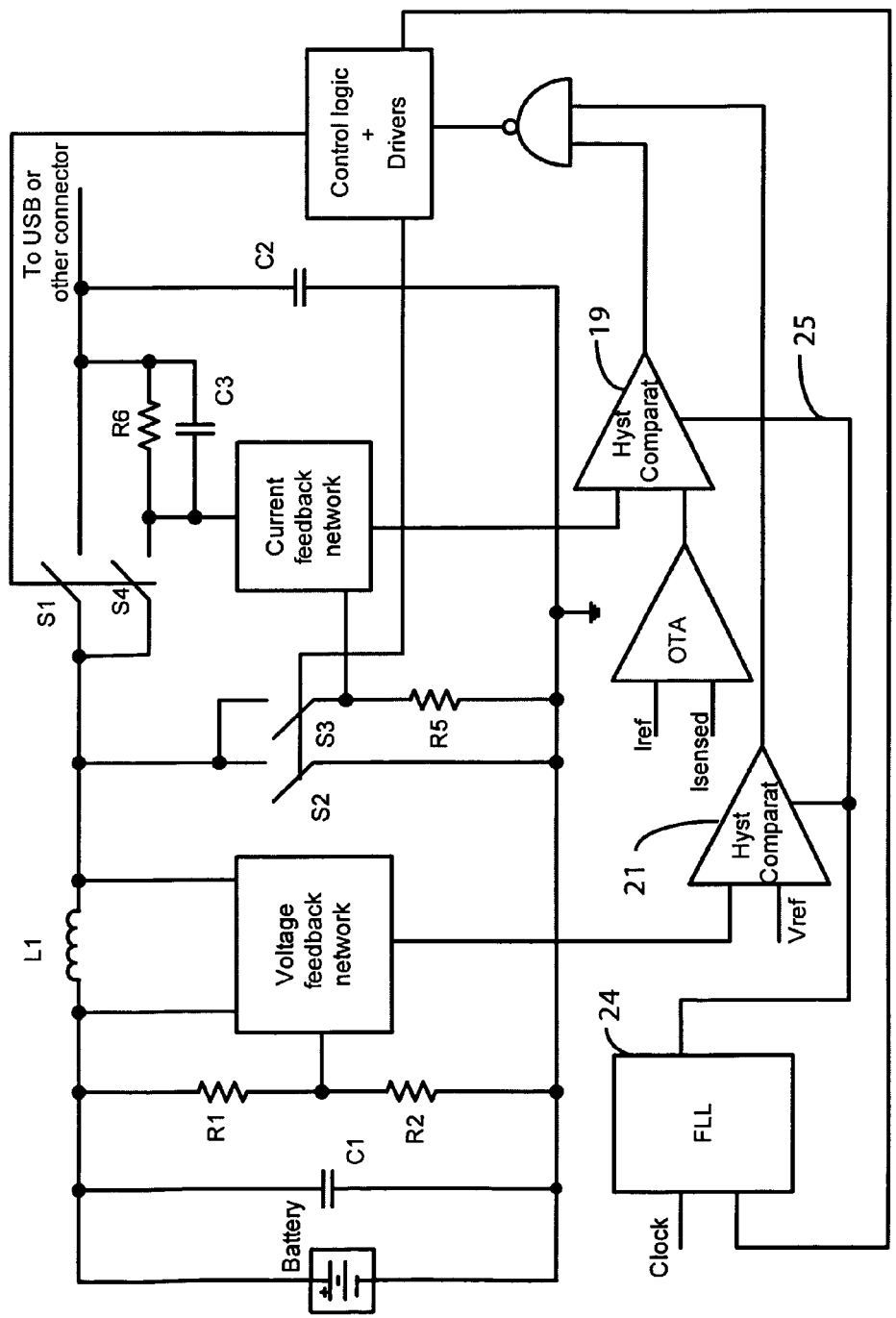
FIG. 5 shows a schematic of the bidirectional hysteretic power converter when operating as battery charger that includes the frequency control circuit according to another embodiment of the present invention.

FIG. 5 shows a very similar schematic to the one described for FIG. 4, with the addition of a switching frequency control block 24 that can be implemented as an FLL (Frequency Lock Loop) or as a PLL (Phase Lock Loop), as well known to anyone skilled in the art. The block 24, that performs the control of the switching frequency, monitors the drive signal from the control logic block and compares that signal with a clock signal. If the frequency of the two signals is different, the output signal 25 compensates for the frequency difference and modulates the hysteresis of the comparator blocks 19 and 21 in order to regulate the converter's switching frequency to be the same as the frequency of the clock signal.

In the depicted implementation the frequency is controlled by varying the hysteresis of the comparators, but many other means are also possible. The signal 25 is driving the hysteresis levels of both comparators even if, at any time, only one comparator may be active. This guarantees that the transition between the two modes of operation is fast and smooth without causing a large frequency perturbation. In addition to the described modes of operation when the battery voltage reaches the desired output voltage the inductor current tends to become discontinuous and the pulses of current into the battery may get less frequent, depending on the total load.

When the load current is low enough, and dependently on the output and input voltage ratio, the inductor current may reach the zero value. If the control loop operates in CCM the inductor current becomes negative impacting adversely the converter's efficiency. It is then advantageous to monitor the inductor current by means of sensing the voltage drop across the switch itself, turning off the switch when the inductor current reaches zero and resuming the switching when the ramp signal at the output of the feedback network toggles the fast comparator.

The inductor charging phase can then be kept active for a predetermined amount of time seeking the optimum trade-off between the switching frequency and the output voltage ripple with the purpose of maximizing the overall converter efficiency. This mode is the DCM mode of operation and it is characterized by a lower switching frequency. The lower the switching frequency, the higher the output voltage ripple for a given inductor and output capacitor value. At light loads it may be desirable to allow higher output voltage ripple in order to obtain higher efficiency. The DCM mode can also be properly adjusted by choosing adequately the values of the components in the feedback network, since automatically, lighter loads command longer time for the output voltage to drop and for the synthetic ripple signal to toggle.

Similarly to what has been described above, the signal proportional to the inductor current can also be utilized as current limit sense. Additionally, the same feedback network, if appropriately sized in the values of its components, can be utilized in the case of DCM mode of operation when the load falls below a certain value.

E FIG. 6

Figure 6:
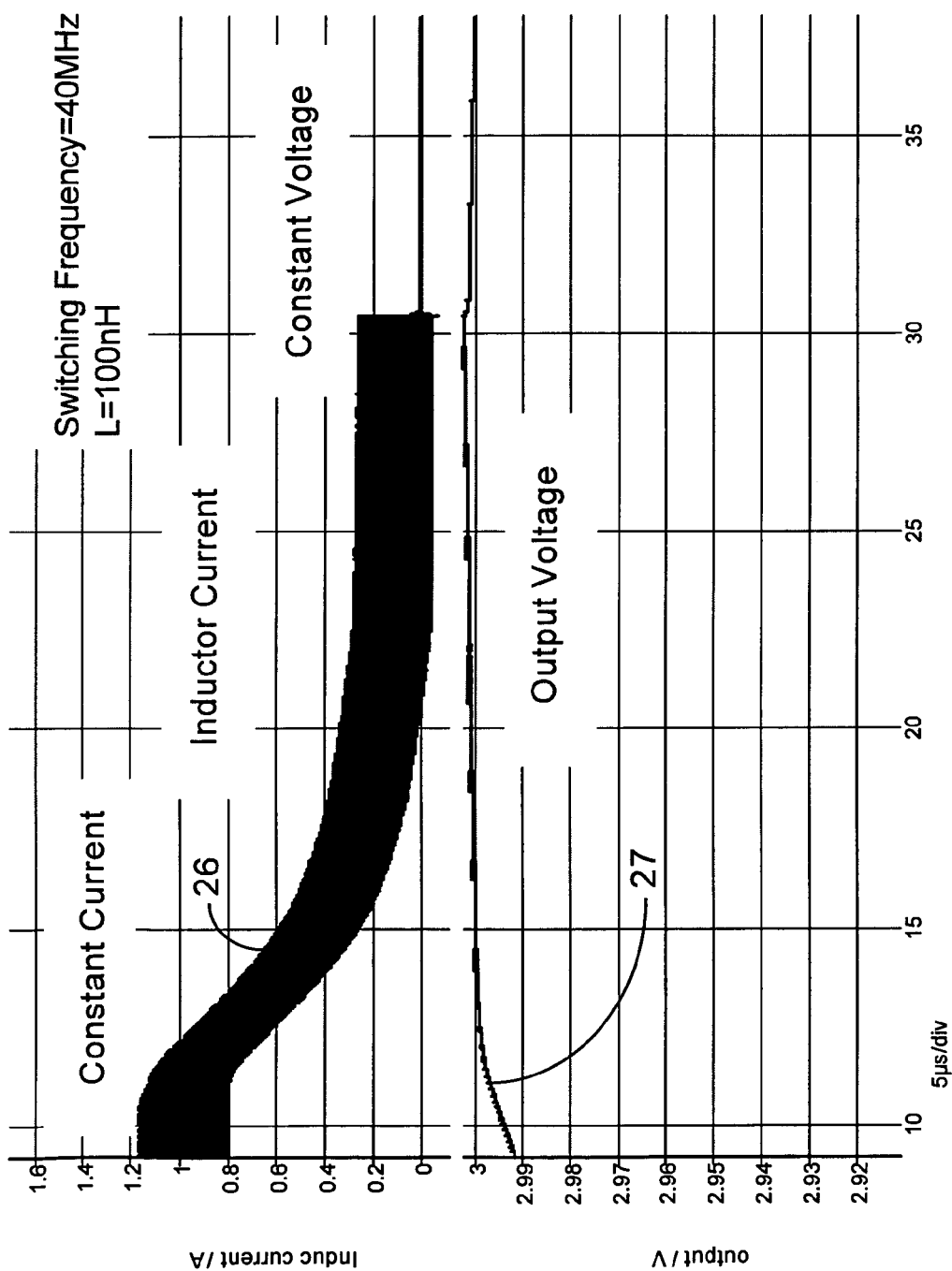
FIG. 6 shows the battery voltage and the inductor current waveforms as result of the accelerated simulation of the circuit of FIG. 5.

FIG. 6 shows the simulation results of the circuit described in FIG. 5. In particular in this simulation the charge of the battery has been accelerated for practical purposes. It can be noted that waveform 27 shows the battery voltage (in this case to be regulated arbitrarily at 3V) and the waveform 26 the inductor current. It clearly shows that when the output voltage approaches the desired value, the inductor current starts decreasing transitioning to constant voltage mode of operation. When the inductor current decreases to value that are negative the converter switches to DCM mode of operation, turning off both power transistors and operating in PFM.

In the simulated circuit the value of the inductor was 100nH and the switching frequency was regulated to be 40 MHz. The simulated results show that the hysteretic approach works with excellent result even to charge a battery or a load with large output capacitors.

Although the present invention has been described above with particularity, this was merely to teach one of ordinary skill in the art how to make and use the invention. Many additional modifications will fall within the scope of the invention. Thus, the scope of the invention is defined by the claims which immediately follow.

What is claimed is:

1. A switching bidirectional power converter to efficiently convert power comprising:

an inductor coupled between a first main terminal of said power converter and a switching node;

a first power device coupled between said switching node and the negative terminal of said power converter;

a second power device coupled between said switching node and a second main terminal of said power converter;

wherein the flow of power flows in a first direction from said first main terminal of said power converter to said second main terminal of said power converter when said power converter operates as a step up converter, and flows in a second direction from said second main terminal of said power converter to said first main terminal of said power converter when it operates as a step down converter;

a first feedback network to generate a first synthetic ripple signal when said power converter operates as a step up converter;

a second feedback network to generate a second synthetic ripple signal when said power converter operates as a step down converter;

a comparator providing hysteretic control of said power converter in response to said first and second synthetic ripple signals, to a reference signal, and to a mode selection signal;

wherein said mode selection signal determines whether said power converter operates as a step up converter or as a step down converter, and a control logic circuit and a pre-driver circuit for generating the signals to drive said first and second power devices in response to the output signal of said comparator.

2. The switching bidirectional power converter of claim 1, wherein said comparator is replaced by a first comparator to receive said first synthetic ripple signal from said first feedback network and by a second comparator to receive said second synthetic ripple signal from said second feedback network, and wherein said mode selection signal is fed to said control logic circuit to generate the signals to drive said first and second power devices in response to said first and second comparators.

3. The switching bidirectional power converter of claim 1, wherein said first and second feedback networks are replaced by one single feedback network to generate a synthetic ripple signal, in response to said mode selection signal, and wherein said comparator provides hysteretic control of said switching power converter in response to said synthetic ripple signal, and to said reference signal.

4. The switching bidirectional power converter of claim 1, wherein the switching frequency of said power converter is maintained substantially constant in continuous conduction mode by controlling the hysteresis levels of said comparator by means of a frequency control circuit.

5. The switching bidirectional power converter of claim 1, wherein the switching frequency of said power converter is maintained substantially constant in continuous conduction mode by controlling the time constants of said first and second synthetic ripple signals of said first and second feedback networks by means of a frequency control circuit.

6. The switching bidirectional power converter of claim 1, wherein the switching frequency in continuous conduction mode is substantially constant and wherein said switching frequency is higher than 10 MHz.

7. The switching bidirectional power converter of claim 1, wherein said first and said second feedback networks are comprising components to alter the operation of said switching bidirectional power converter depending on the conduction modes of said switching bidirectional power converter.

8. A method to efficiently convert power from a first power source, coupled to a first main terminal of a power converter, to a second main terminal of said power converter or from a second power source, coupled to said second main terminal of said power converter, to said first main terminal of said power converter comprising:

switching a first power device and a second power device;

charging and discharging with a modulated duty cycle an inductor;

whereby the flow of power in said inductor can be in a first direction or in a second direction in response to a mode selection signal;

generating a first synthetic ripple signal when the flow of power is in said first direction and a second synthetic ripple signal when the flow of power is in said second direction opposite to said first direction;

comparing said first or said second synthetic ripple signal to a reference signal by means of a comparator in response to said mode selection signal;

modulating the duty cycle of said first and second power devices in response to the output of said comparator, whereby the voltage appearing at said first main terminal when the flow of power is in said first direction or the voltage appearing at said second main terminal when the flow of power is in said second direction is regulated to be at a desired value, and whereby the modulation of the duty cycle occurs by means of an hysteretic control.

9. The method of claim 8, wherein the voltage appearing at said second main terminal is regulated to be higher than the voltage of said first power source if the flow of power is in said first direction, and wherein the voltage appearing at said first main terminal is regulated to be lower than the voltage of said second power source if the flow of power is in said second direction.

10. The method of claim 8, wherein said comparator is replaced by a first comparator to receive said first synthetic ripple signal generated in a first feedback network, and by a second comparator to receive said second synthetic ripple signal generated in a second feedback network, and wherein said mode selection signal is fed to a control logic circuit to generate the signals to drive said first and second power devices in response to said first and second comparators.

11. The method of claim 8, wherein said first and second synthetic ripple signals are replaced by a single synthetic ripple signal generated by a feedback network in response to said mode selection signal and, wherein said comparator provides hysteretic control of said power converter in response to said single synthetic ripple signal, and to a reference signal.

12. The method of claim 8, wherein the switching frequency is maintained substantially constant in continuous conduction mode by controlling the hysteresis levels of said comparator by means of a frequency control circuit.

13. The method of claim 8, wherein the switching frequency is maintained substantially constant in continuous conduction mode by controlling the time constants of said first and second synthetic ripple signals by means of a frequency control circuit.

14. The method of claim 8, wherein the switching frequency in continuous conduction mode is substantially constant and wherein said switching frequency is higher than 10 MHz.

15. A switching power converter to efficiently convert power from a power source to charge a battery comprising:
- an inductor coupled between a first main terminal of said power converter and a switching node;
- a first power device coupled between said switching node and the negative terminal of said power converter;
- a second power device coupled between said switching node and a second main terminal of said power converter;
  - wherein said battery is coupled to said first main terminal when said power source is coupled to said second main terminal, and
  - wherein said battery is coupled to said second main terminal when said power source is coupled to said first main terminal;
- a first feedback network to generate a first synthetic ripple signal when said power converter operates in constant voltage mode;
- a second feedback network to generate a second synthetic ripple signal when said power converter operates in constant current mode;
- a first comparator providing hysteretic control of said switching power converter in response to said first synthetic ripple signal and to a first reference signal;
- a second comparator providing hysteretic control of said switching power converter in response to said second synthetic ripple signal and to a second reference signal;
- a control logic circuit and a pre-driver circuit for generating the signals to drive said first and second power devices in response to the output signals of said first and second comparator, and
  - whereby the modulation of the duty cycle of said switching power converter occurs by means of an hysteretic control in constant current mode of operation and in constant voltage mode of operation.

16. The switching power converter of claim 15, wherein the flow of power flows in a first direction to charge said battery and in a second direction to convert power from said battery to a load when said power source is replaced by said load, and
- whereby the operation to charge said battery constitutes one mode of operation of said switching power converter that operates as a step up converter in one direction and as a step down converter in another direction.

17. The switching power converter of claim 15, wherein said second reference signal is replaced by the output signal of a transconductance amplifier that operates in response to a current reference signal and to an inductor current sensing signal.

18. The switching power converter of claim 15, wherein the switching frequency is maintained substantially constant in continuous conduction mode by controlling the hysteresis levels of said first and second comparator by means of a frequency control circuit.

19. The switching power converter of claim 15, wherein the switching frequency is maintained substantially constant in continuous conduction mode by means of a frequency control circuit, and
- wherein said switching frequency is higher than 10 MHz.

20. The switching power converter of claim 15, wherein said first and said second feedback networks are replaced by a single feedback network to generate a single synthetic ripple signal, and
- wherein said first and second comparators are replaced by a single comparator providing hysteretic control of said switching power converter in response to said single synthetic ripple signal.

* * * * *